United States Patent
Arolovitch et al.

(10) Patent No.: US 10,225,340 B2
(45) Date of Patent: Mar. 5, 2019

(54) OPTIMIZING DATA TRANSMISSION BETWEEN A FIRST ENDPOINT AND A SECOND ENDPOINT IN A COMPUTER NETWORK

(71) Applicant: Zephyrtel, Inc., Austin, TX (US)

(72) Inventors: Alan Arolovitch, Brookline, MA (US); Shmuel Bachar, Herzliyya (IL); Dror Moshe Gavish, Shoham (IL); Shahar Guy Grin, Ramat HaSharon (IL); Shay Shemer, Hod Hasharon (IL)

(73) Assignee: Zephyrtel, Inc., Austin, TX (US)

( * ) Notice: Subject to any disclaimer, the term of this patent is extended or adjusted under 35 U.S.C. 154(b) by 0 days.

(21) Appl. No.: 14/678,537

(22) Filed: Apr. 3, 2015

(65) Prior Publication Data
US 2015/0358405 A1 Dec. 10, 2015

Related U.S. Application Data

(63) Continuation of application No. 13/341,409, filed on Dec. 30, 2011, now abandoned.
(Continued)

(51) Int. Cl.
*G06F 15/16* (2006.01)
*H04L 29/08* (2006.01)
(Continued)

(52) U.S. Cl.
CPC ......... *H04L 67/1095* (2013.01); *H04L 12/66* (2013.01); *H04L 29/08729* (2013.01);
(Continued)

(58) Field of Classification Search
CPC ............. H04L 67/2819; H04L 67/2809; H04L 63/0281
(Continued)

(56) References Cited

U.S. PATENT DOCUMENTS

| 3,289,358 A | 12/1966 | Longobardi |
| 5,764,982 A | 6/1998 | Madduri |

(Continued)

FOREIGN PATENT DOCUMENTS

| EP | 1011244 A2 | 6/2000 |
| JP | 2001-109743 A | 4/2001 |

(Continued)

OTHER PUBLICATIONS

Knutsson et al., Transparent Proxy Signalling, 1999, pp. 1-11.*
(Continued)

*Primary Examiner* — Hieu T Hoang

(57) ABSTRACT

A computer-implemented method is provided for transparently optimizing data transmission between a first endpoint and a second endpoint in a computer network. The endpoints have a directly established data session therebetween. The data session is identified by each endpoint at least to itself in the same way throughout the session. The method includes the steps of: relaying data between the endpoints transparently in the session using a network optimization service; and transparently modifying or storing at least some of the data transmitted from the second endpoint to the first endpoint using the network optimization service in order to optimize data communications between the endpoints, wherein transparently modifying at least some of the data comprises changing the data, replacing the data, or inserting additional data such that the first endpoint receives different data than was sent by the second endpoint.

20 Claims, 6 Drawing Sheets

Related U.S. Application Data

(60) Provisional application No. 61/428,527, filed on Dec. 30, 2010.

(51) Int. Cl.
*H04L 29/12* (2006.01)
*H04L 12/707* (2013.01)
*H04L 12/761* (2013.01)
*H04L 12/66* (2006.01)
*H04L 29/06* (2006.01)

(52) U.S. Cl.
CPC .............. *H04L 45/16* (2013.01); *H04L 45/22* (2013.01); *H04L 61/2007* (2013.01); *H04L 67/14* (2013.01); *H04L 67/2828* (2013.01); *H04L 67/327* (2013.01); *H04L 69/163* (2013.01)

(58) Field of Classification Search
USPC .................................................. 709/227–229
See application file for complete search history.

(56) References Cited

U.S. PATENT DOCUMENTS

| | | |
|---|---|---|
| 5,778,185 A | 7/1998 | Gregerson et al. |
| 5,852,717 A | 12/1998 | Bhide et al. |
| 5,884,046 A | 3/1999 | Antonov |
| 5,907,678 A | 5/1999 | Housel, III et al. |
| 5,950,198 A | 9/1999 | Falls et al. |
| 5,950,205 A | 9/1999 | Aviani, Jr. |
| 5,960,404 A | 9/1999 | Chaar et al. |
| 5,987,376 A | 11/1999 | Olson et al. |
| 6,003,045 A | 12/1999 | Freitas et al. |
| 6,018,780 A | 1/2000 | Fenchel |
| 6,085,251 A | 7/2000 | Fabozzi, II |
| 6,105,029 A | 8/2000 | Maddalozzo, Jr. et al. |
| 6,185,598 B1 | 2/2001 | Farber et al. |
| 6,199,107 B1 | 3/2001 | Dujari |
| 6,219,786 B1 | 4/2001 | Cunningham et al. |
| 6,240,461 B1 | 5/2001 | Cieslak et al. |
| 6,263,371 B1 | 7/2001 | Geagan, III et al. |
| 6,286,084 B1 | 9/2001 | Wexler et al. |
| 6,304,914 B1 | 10/2001 | Deo et al. |
| 6,339,785 B1 | 1/2002 | Feigenbaum |
| 6,366,907 B1 | 4/2002 | Fanning et al. |
| 6,424,992 B2 | 7/2002 | Devarakonda et al. |
| 6,434,608 B1 | 8/2002 | Desai |
| 6,460,087 B1 | 10/2002 | Saito et al. |
| 6,622,157 B1 | 9/2003 | Heddaya et al. |
| 6,742,023 B1 | 5/2004 | Fanning et al. |
| 6,865,600 B1 | 3/2005 | Brydon et al. |
| 6,940,835 B2* | 9/2005 | Reza .................. H04W 8/26 370/331 |
| 6,976,165 B1 | 12/2005 | Carpentier et al. |
| 7,010,578 B1 | 3/2006 | Lewin et al. |
| 7,043,644 B2 | 5/2006 | DeBruine |
| 7,111,057 B1* | 9/2006 | Sherman ............ G06F 17/3089 707/999.01 |
| 7,203,741 B2* | 4/2007 | Marco ................. H04L 69/329 709/223 |
| 7,240,100 B1* | 7/2007 | Wein .................. H04L 67/1008 709/214 |
| 7,616,625 B1* | 11/2009 | Un ..................... H04L 12/2859 370/247 |
| 7,706,266 B2 | 4/2010 | Plamondon |
| 7,793,342 B1* | 9/2010 | Ebrahimi ............ H04L 63/0281 713/166 |
| 7,801,945 B1 | 9/2010 | Geddes et al. |
| 8,208,430 B2* | 6/2012 | Valmikam ........... H04L 67/2823 370/328 |
| 8,463,941 B1* | 6/2013 | Welch ................. H04L 67/1097 709/238 |
| 2002/0010866 A1 | 1/2002 | McCullough et al. |
| 2002/0049760 A1 | 4/2002 | Scott et al. |
| 2002/0133621 A1 | 9/2002 | Marco et al. |
| 2003/0005040 A1 | 1/2003 | Kukkal |
| 2003/0046409 A1 | 3/2003 | Graham |
| 2003/0061337 A1* | 3/2003 | Sato .................... H04L 67/2819 709/223 |
| 2003/0140159 A1 | 7/2003 | Campbell et al. |
| 2003/0195940 A1 | 10/2003 | Basu et al. |
| 2005/0102427 A1* | 5/2005 | Yokota ................ H04L 67/1002 709/245 |
| 2005/0132049 A1 | 6/2005 | Inoue et al. |
| 2005/0204001 A1* | 9/2005 | Stein .................... G06Q 10/107 709/206 |
| 2005/0229184 A1* | 10/2005 | Inoue .................... G06F 9/544 719/310 |
| 2006/0168088 A1 | 7/2006 | Leighton et al. |
| 2006/0212584 A1 | 9/2006 | Yu et al. |
| 2007/0198726 A1 | 8/2007 | Marco et al. |
| 2008/0005349 A1 | 1/2008 | Li et al. |
| 2008/0046596 A1 | 2/2008 | Afergan et al. |
| 2008/0281908 A1 | 11/2008 | McCanne et al. |
| 2009/0177778 A1 | 7/2009 | Turk |
| 2009/0274046 A1 | 11/2009 | Singh et al. |
| 2010/0005171 A1 | 1/2010 | Arolovitch |
| 2010/0095021 A1* | 4/2010 | Samuels ............. H04L 12/5695 709/235 |
| 2011/0173345 A1* | 7/2011 | Knox .................. H04L 67/2833 709/246 |
| 2011/0320521 A1* | 12/2011 | Steiner ................ G06F 9/547 709/203 |
| 2012/0011324 A1 | 1/2012 | Fung et al. |

FOREIGN PATENT DOCUMENTS

| | | |
|---|---|---|
| JP | 2004-102951 A | 4/2004 |
| JP | 2006-027394 A | 2/2006 |
| JP | 2006-139398 A | 6/2006 |
| JP | 2009-089197 | 4/2009 |
| WO | 20090101004 A1 | 8/2009 |
| WO | 2009138076 A2 | 11/2009 |

OTHER PUBLICATIONS

Barish, G., et al., "World Wide Web Caching Trends and Techniques," IEEE Communications Magazine, May 2000, pp. 178-185.

Oversi, "P2P Content Delivery Solutions," White Paper, Jul. 2007 [retrieved Feb. 2, 2009 (Feb. 2, 2009)] Retrieved from the Internet. <URL: http://www.oversi.com/images/stories/white_paper_july.pdf> Entire document, especially: p. 5, para 4; p. 6, para 1-2; p. 8, para 1, Fig; 4; p. 9, para 1.

Nortel, "Delivering Application Availability, Performance and Security," Product Brief, Copyright 2007 Nortel Networks, [retrieved Feb. 2, 2009 (Feb. 2, 2009)] Retrieved from the Internet. <URL: http://www.pcerapp.com/docs/Nortel_Application_Switch.pdf> Entire document, especially: p. 1, col. 1, para 2-3; p. 2, col. 2, para 1.

Squid Web Proxy Cache, "Transparent Caching/Proxying," Squid Frequently Asked Questions, Jun. 19, 2000, XP002352177, www.squid-cache.org, retrieved Nov. 2, 2005 from http://web.archive.org/web/20000619163655/http://www.squidcache. ora/DocIFAQ/FAQ-17.html.

Stevens, et al., Professional Computing Series TCP/IP Illustrated vol. 1: The Protocols,1994, pp. 1-20.

Xie, H., "P4P: Proactive Provider Assistance for P2P," Yale Computer Science YALE/DCS/TR1377, May 25, 2007 (May 25, 2007) [retrieved Feb. 2, 2008 (Feb. 2, 2008)] Retrieved from the Internet. <URL: http://codex.cs.yale.edu/avi/home-page/p4p-dir/talks/P4PVision_NYP2P.ppt> Entire document, especially: p. 6-11, 14, 19.

International Search Report and Written Opinon for PCT/US2011/068172, dated Aug. 29, 2012.

Chinese Office Action for application No. 201180068664.6, dated Jun. 30, 2015.

Japanese Office Action for application No. 2013-547704, dated Nov. 17, 2015.

Final Office Action dated Mar. 6, 2014, mailed in U.S. Appl. No. 13/341,409, pp. 1-25.

(56) References Cited

OTHER PUBLICATIONS

Response to Non-Final Office Action dated Jul. 22, 2013, as filed in U.S. Appl. No. 13/341,409, filed Jan. 22, 2014, pp. 1-11.
Non-Final Office Action dated Jul. 22, 2013, mailed in U.S. Appl. No. 13/341,409, pp. 1-24.
Request for Continued Examination (RCE) and RCE Submission as filed in U.S. Appl. No. 13/341,409 on May 7, 2013, pp. 1-14.
Final Office Action dated Nov. 7, 2012, mailed in U.S. Appl. No. 13/341,409, pp. 1-22.
Response to Non-Final Office Action dated Mar. 22, 2012, as filed in U.S. Appl. No. 13/341,409, filed Sep. 24, 2012, pp. 1-11.
Non-Final Office Action dated Mar. 22, 2012, mailed in U.S. Appl. No. 13/341,409, pp. 1-22.
Extended European Search Report dated Jun. 20, 2017, mailed in European Patent Application No. 11854377.6, pp. 1-10.
Björn Knuttson and Larry Peterson, "Transparent Proxy Signalling", Journal of Communications and Networks, Jan. 1, 2001, pp. 1-11, Retrieved online Feb. 8, 2018 from https://www.semanticscholar.org/paper/Transparent-Proxy-Signalling-Knutsson-Peterson/221c50525f23f15206c07ad7a1170038328d94dc.
Ariel Cohen, Sampath Rangarajan, and Navjot Singh, "Supporting Transparent Caching with Standard Proxy Caches", Bell Laboratories, Lucent Technologies, Murray Hill, NJ, 1999, pp. 1-11, Retrieved online Feb. 8, 2018 from http://citeseerx.ist.psu.edu/viewdoc/download;jsessionid=B89F34D422D2F03F97AD15041208B2CB?doi=10.1.1.41.2566&rep=rep1&type=pdf (Per MPEP 609.04(a), Applicant points out that the year of publication is sufficiently earlier than the effective U.S. filing date.
Response to the Communication pursuant to Rules 70(2) and 70a(2) EPC dated Jul. 7, 2017 as filed in European Patent Application No. 11854377.6, pp. 1-16.
Communication of Intention to Grant dated Jun. 8, 2018, mailed in European Patent Application No. 11854377.6, pp. 1-9.

\* cited by examiner

FIG. 2A
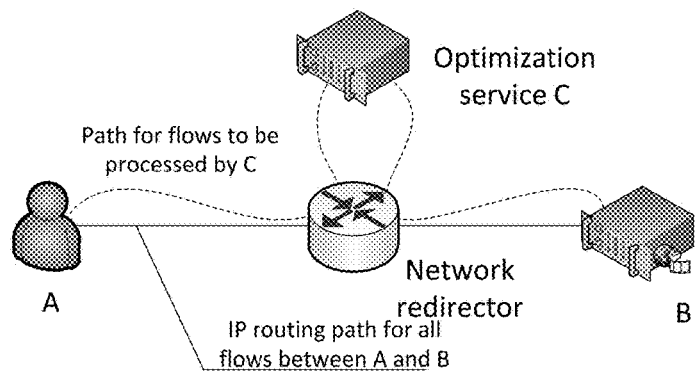
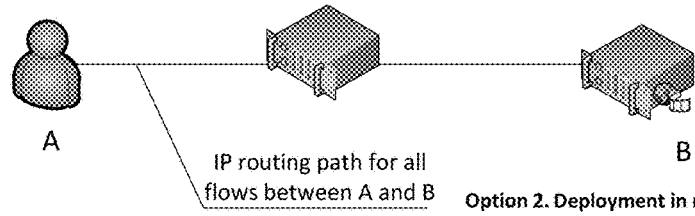
FIG. 2B
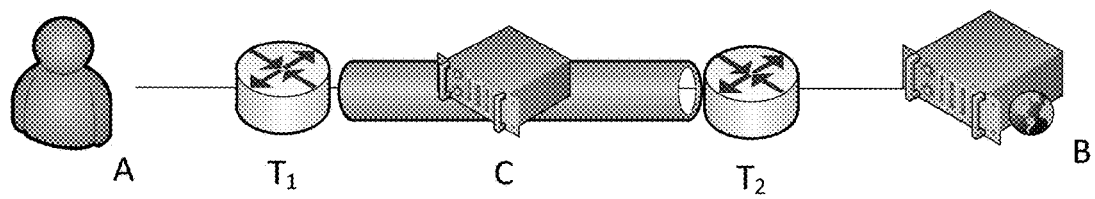
FIG. 3

OPTIMIZING DATA TRANSMISSION BETWEEN A FIRST ENDPOINT AND A SECOND ENDPOINT IN A COMPUTER NETWORK

CROSS REFERENCE TO RELATED APPLICATION

This application is a continuation of U.S. patent application Ser. No. 13/341,409, filed on Dec. 30, 2011, entitled METHODS AND SYSTEMS FOR TRANSMISSION OF DATA OVER COMPUTER NETWORKS, which claims priority from U.S. Provisional Patent Application No. 61/428,527, filed on Dec. 30, 2010, entitled METHODS AND SYSTEMS FOR TRANSMISSION OF DATA OVER COMPUTER NETWORKS, both of which are hereby incorporated by reference.

BACKGROUND

The present application relates generally to transmissions of data over a computer network such as, e.g., the Internet, a local area network, a wide area network, a wireless network, and others.

Both enterprise and consumer broadband networks have undergone significant and continuous growth of traffic volumes for the last 3-5 years. The traffic growth is driven by introduction of faster end user connectivity options, adoption of various bandwidth-intensive applications, and introduction of various Internet-connected consumer electronics products.

To respond to network congestion, degradation of application performance, and, the need to continuously upgrade their networks, caused by the broadband growth, broadband network operators have introduced various network optimization solutions and services aimed at controlling their network costs, containing growth of network scale, improving performance and security of Internet applications, and creating new revenue sources for the operators.

Such solutions include content caching, video transcoding and transrating, content adaptation, content filtering, intrusion detection and prevention, among others.

All these solution classes share several common deployment requirements. They should be deployed in a transparent way, so that Internet applications may operate without change.

It is also common for some network optimization solutions to modify the Internet content flow and/or content payload itself.

Furthermore, the network optimization solutions should address the scale requirements of modern broadband networks that frequently operate on 10 Gbps, 40 Gbps and 100 Gbps scale.

Common solution architecture for network-based optimization involves a network optimization platform deployed in conjunction with a network element (e.g., routing, switching or dedicated DPI equipment) that sits in data path and redirects traffic to the network optimization platform.

Network elements typically employ selective redirection of network traffic, matching types of traffic flows to the network optimization service used.

Network optimization services commonly use application proxy architecture. A connection that otherwise would be established between two endpoints 'A' and 'B' (e.g., an Internet browser and a Web server), is terminated by proxy 'P' and two distinct transport sessions (TCP or UDP) are created between A and P on one hand, and P and B on the other. Following the connection setup, the proxy P relays data between the two sessions at application level.

The proxy architecture carries significant performance penalties due to the need to maintain transport (TCP or UDP) stack for all sessions flowing across the network, to copy data to relay all data at application level, and perform conversion from data frames to application buffers and back.

As a result of these limitations, the proxy architecture limits throughput of network optimization applications to 1-2 Gbps per standard Intel-based server, and number of concurrently supported flows to tens of thousands. The performance limitation effectively blocks the network optimization solutions from scaling to 10/40/100 Gbps network scale in an economical fashion.

Thus, there exists a need in for an alternative architecture for network optimization platforms that would eliminate the above bottlenecks of the application proxy architecture.

BRIEF SUMMARY OF THE DISCLOSURE

In accordance with one or more embodiments, a computer-implemented method is provided for transparently optimizing data transmission between a first endpoint and a second endpoint in a computer network. The endpoints have a directly established data session therebetween. The data session is identified by each endpoint at least to itself in the same way throughout the session. The method includes the steps of: relaying data between the endpoints transparently in the session using a network optimization service; and transparently modifying or storing at least some of the data transmitted from the second endpoint to the first endpoint using the network optimization service in order to optimize data communications between the endpoints, wherein transparently modifying at least some of the data comprises changing the data, replacing the data, or inserting additional data such that the first endpoint receives different data than was sent by the second endpoint.

In accordance with one or more further embodiments, an optimization service is provided for transparently optimizing data transmission between a first endpoint and a second endpoint in a computer network. The endpoints have a directly established data session therebetween. The data session is identified by each endpoint at least to itself in the same way throughout the session. The optimization service is configured to: relay data between the endpoints transparently in the session using a network optimization service; and transparently modify or store at least some of the data transmitted from the second endpoint to the first endpoint using the network optimization service in order to optimize data communications between the endpoints, wherein modification of data comprises changing the data, replacing the data, or inserting additional data such that the first endpoint receives different data than was sent by the second endpoint.

Various embodiments of the invention are provided in the following detailed description. As will be realized, the invention is capable of other and different embodiments, and its several details may be capable of modifications in various respects, all without departing from the invention. Accordingly, the drawings and description are to be regarded as illustrative in nature and not in a restrictive or limiting sense, with the scope of the application being indicated in the claims.

BRIEF DESCRIPTION OF THE DRAWINGS

FIGS. 2A and 2B (collectively FIG. 2) are simplified diagrams illustrating deployment of an optimization service in accordance with one or more embodiments.

FIG. 3 is a simplified diagram illustrating deployment of an optimization service operating in a tunnel in accordance with one or more embodiments.

Like or identical reference characters are used to identify common or similar elements.

DETAILED DESCRIPTION

Various embodiments disclosed herein are directed to a service for optimizing data transmission in a computer network between endpoints having a directly established session therebetween. The optimization service transparently modifies or stores at least some of the data transmitted between the endpoints or introduces a new request to an endpoint in order to optimize data communications between the endpoints. Each endpoint identifies the session to itself in the same way throughout the session.

As used herein, the term "network node" refers to any device, connected to an IP-based network, including, without limitation, computer servers, personal computers (including desktop, notebook, and tablet computers), smart phones, and other network connected devices.

As used herein, the term "endpoint" refers to an end point of a bi-directional inter-process communication flow across an IP-based network, residing on a network node connected to such network. Examples of endpoints include, without limitation, TCP sockets, SCTP sockets, UDP sockets, and raw IP sockets.

The optimization service operates as part of device involved in relaying of data between network nodes on an IP-based network. Examples of such devices include, without limitation, residential home gateways, WiFi hotspots, firewalls, routers, Metro Ethernet switches, optical switches, DPI devices, computer servers, application gateways, cable modem termination systems (CMTS), optical line terminals (OLT), broadband network gateways (BNG), broadband access servers (BRAS), DSL access multiplexers (DSLAM), gateway GPRS support nodes (GGSN), and PDN gateways (PGW).

Figure 1:
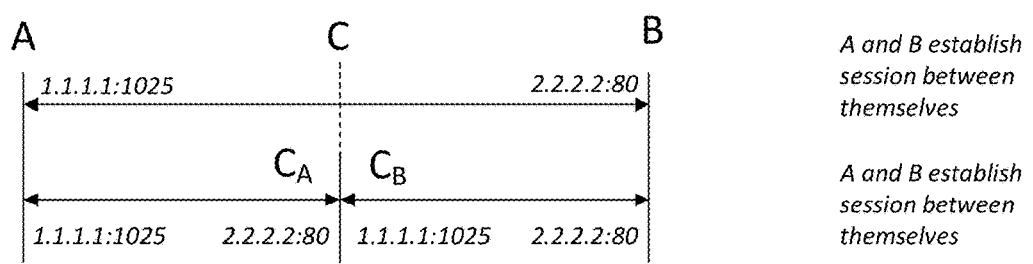
FIG. 1 is a flow diagram illustrating creation of a session between endpoints in accordance with one or more embodiments.

As shown in FIGS. 1 and 2, two endpoints 'A' and 'B' on an IP-based computer network, e.g., ISP subscriber and Internet-based web server, establish data session 'S' between each other. In case of TCP protocol, the session setup phase involves a TCP session handshake, including negotiation of network and transport parameters.

The session S between endpoints A and B involves data queries sent by A to B and, in some cases, data responses sent to B by A. The session may optionally include queries and responses sent by both endpoints.

Each respective endpoint typically identifies the data session S with at least a 5-tuple: IP address and port of the local endpoint, IP address and port of the remote endpoint and protocol used (e.g., TCP, UDP, or other). The definition of the session S by the endpoints A and B may not be identical in case of network address translation (NAT) taking place in the network between A and B.

The endpoints A and B optionally keep track of the data sent and received, by counting bytes and/or frames sent and received. The endpoints A and B may further keep track of the data sent and received by the remote endpoint, for purposes of packet loss detection and retransmission, congestion avoidance, congestion control, among others.

The identification of the session S by each respective endpoint does not change throughout the session lifetime.

In accordance with one or more embodiments, following an establishment of the session S between endpoints A and B, an optimization service 'C' creates a transparent endpoint $C_A$ facing the endpoint A, that would be appear to endpoint A as endpoint B, at both network and transport levels, as defined by TCP/IP model per RFC1122.

As illustrated in FIG. 1, the service C may optionally create two transparent endpoints $C_A$ and $C_B$, with the endpoint $C_A$ appearing to endpoint A as an endpoint B, and the endpoint $C_B$ appearing to endpoint B as an endpoint A.

In accordance with one or more embodiments, the service C creates transparent endpoints per [0035-0036] in only some sessions it processes, with the decision being taken by C based on at least one variable including, e.g., temporal information, ordinal information, frequency information, endpoint identification information, session identification information, network state information, and external policy information.

In accordance with one or more embodiments, the service C may relay all data frames in the session S between A and B, either by being in data path between the session endpoints, or through use of one or more dedicated redirection devices (e.g., a load balancer, router, DPI device, etc.) that sit in data path and redirect specific data sessions to the service C, as depicted in FIGS. 2A and 2B.

In accordance with other embodiments, service C may relay only portion of data frames in the session between A and B. For example, the redirection device may redirect the session S to the service C starting from certain frame within the session, using Layer7 analysis of the session to determine whether the session should be redirected to service C.

When the service C relays data frames between endpoint A and endpoint B without creating transparent endpoints, it may do so at a physical level (e.g., by switching data frames from port to port), or at link level (e.g., by changing MAC addresses and/or VLAN tags), or by combination of the above.

In accordance with one or more embodiments, the service C may optionally perform a network address translation (NAT) of the session it processes.

As part of the relaying, C is continuously tracking and storing the state of the connection, including all or some variables from the following group:

- static session identifiers (endpoint addresses and port numbers, transport protocol used)
- dynamic transport state of each endpoint, including but not limited to sequence identifiers of data sent and acknowledged by each endpoint
- negotiated transport attributes of the session and individual endpoints, including but not limited to TCP options, such as selective ACK, timestamp, scaled window and others
- dynamic network-level attributes of data frames sent in each direction, including but not limited to IP DSCP, IP TOS, IPv6 flow label
- dynamic link-level attributes of data frames sent in each direction, including but not limited to source and destination MAC addresses, 802.1Q VLAN tags, 802.1P priority bits, QinQ stacked VLAN tags dynamic circuit-level attributes of data frames sent in each direction, including but not limited to identity of ingress and egress ports, physical port properties According to one or more embodiments, the service C provides data modification and caching services for one or more data sessions S' between A and B, that traverse the service C in a tunnel established between two endpoints $T_1$ and $T_2$, as illustrated in FIG. 3.

Tunnel protocols supported by the service C can include, but are not limited to, L2TP, PPPoE, PPPoA, L2TP, GRE, GTP-U, IP in IP, MPLS, Teredo, 6RD, 6to4, and PMIP.

According to one or more embodiments, as shown in FIG. 3, the service C tracks the state of the tunneled session between endpoints $T_1$ and $T_2$, across multiple connections between endpoints A and B that traverse the tunnel.

As discussed in further detail below, the service C in accordance with various embodiments provides a number of session modification and other capabilities, including (a) data response caching (b) modification of data queries and data responses (c) introduction of new requests.

(a) Response Caching

Following an establishment of data session S between endpoints A and B as described above in [0030-0034], the data query from endpoint A to endpoint B reaches the service C.

According to one or more embodiments, the service C analyzes the data query to match it with previously stored data responses. To do so, C analyzes the query received from endpoint A based on at least one variable, selected from the group consisting of temporal information, ordinal information, frequency information, client information, and identification information.

If a matching response is found in storage, C delivers the stored response to the endpoint A by itself.

According to one or more embodiments, should a matching response be previously stored by the service C, the service C does not relay the query to the endpoint B, but rather responds to the query by itself.

In accordance with one or more alternate embodiments, the service C relays the query received from endpoint A to endpoint B, receives a response or portion of it from endpoint B, and matches the data query received from endpoint A and the data response, or portion of it, received from endpoint B, against data responses previously stored by C.

In this case, should a matching stored response be identified by the service C, it delivers the stored response, or portion of it, to the endpoint A. In this case, service C blocks relaying of the response received from endpoint B.

In case of the data response being delivered by C, it may cause endpoint B to terminate the data session S on its end or stall delivery of the response.

When sending new data frames to endpoints A and B within session S, that were not received from the opposite endpoint, the service C utilizes the IP and port address of the opposite endpoint as well as the session state that is continuously stored by it, as described above in [0042].

Figure 4:
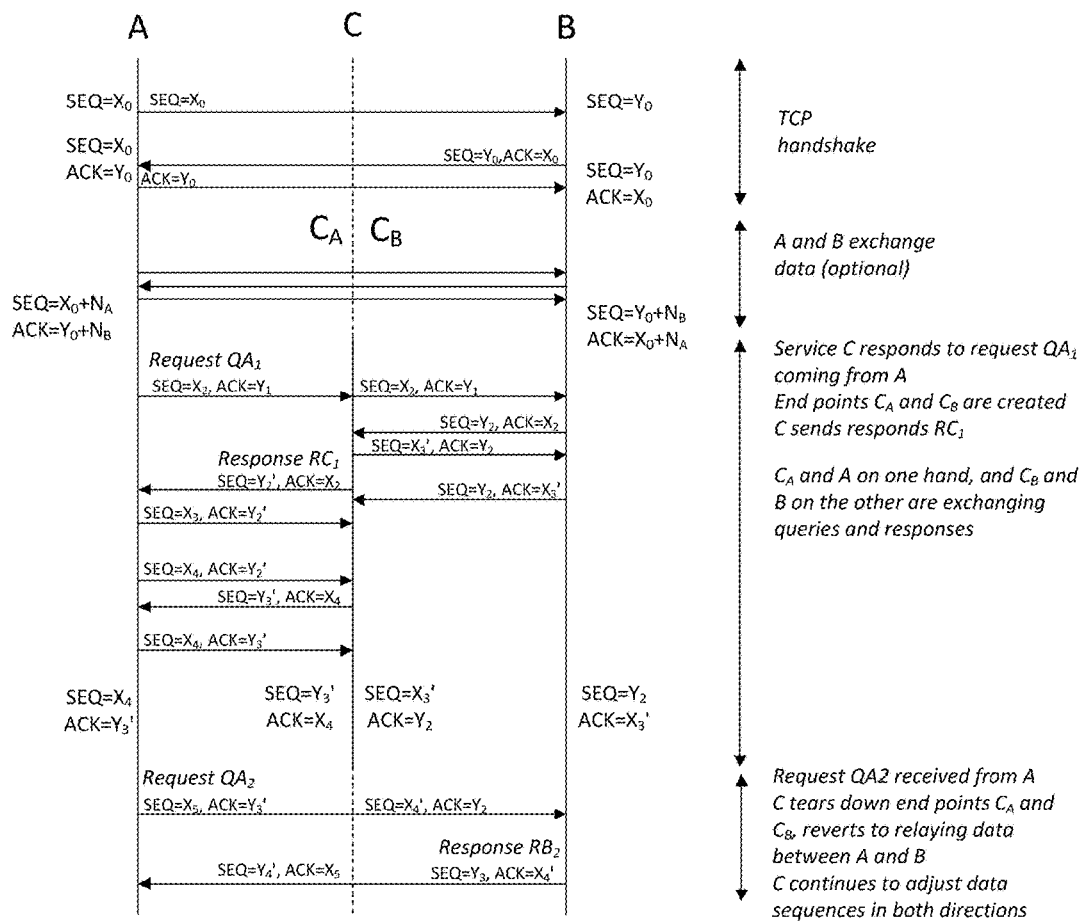
FIG. 4 is a flow diagram illustrating response caching in accordance with one or more embodiments.

Assume that endpoints A and B started sequencing their data streams in session S starting with $X_0$ and $Y_0$, respectively, as depicted in FIG. 4. By the time service C receives the data query from endpoint A that C responds to, service C may have relayed $N_A$ bytes of data from A to B and $N_B$ bytes of data from B to A, where $N_A$ and $N_B$ can be larger than or equal to zero.

Service C keeps track of the sequences of both endpoints A and B and data acknowledged by each endpoint. When service C starts delivering its response to endpoint A, it starts sequencing its data with $Y_0+N_B$, in continuation of data sequences used by endpoint B earlier, while expecting new data from endpoint A starting from $X_0+N_A$, in continuation to sequences sent by endpoint A earlier. It can be said that C initializes an endpoint $C_A$ with TCP sequence number $Y_0+N_B$ and acknowledgement number $X_0+N_A$.

As a result, the data delivered by C appears to endpoint A as a seamless continuation of the session S between A and B.

In case of packets sent by endpoint B to endpoint A sequenced between $Y_0$ and $Y_0+N_B$ are lost in the network segment between C and A, the endpoint A responds by sending back frames with acknowledgment sequence smaller than $Y_0+N_B$ after service C started sending its own data sequenced $Y_0+N_B$ and higher. According to one or more embodiments, C relays such packets to endpoint B, causing endpoint B to re-transmit the lost packets. In this case, C shall only relay back to endpoint A the data in the range between $Y_0$ and $Y_0+N_B$.

Similarly, when sending its own data (i.e., not data received from the other endpoint) to endpoint B, the service C utilizes the current state of endpoint A within session S, as seen by service C.

The description of sequencing of sent and received data done by service C in 0054-0059] applies equally to TCP-like semantics based on individual bytes of data as well as other semantics, including but not limited to sequencing of individual frames exchanged between the two endpoints.

Service C can apply same method of sequencing data as described in [[0054-0059], to multiple protocol layers within same session, including but not limited to TCP/IP session over PPP and PPP-like protocols, TCP/IP session over UDP/IP tunnel etc., session created in IPv6 over IPv4 tunnel, utilizing the data stored using multi-level session tracking as described above in [0043-0044].

According to one or more embodiments, to deliver the previously stored data response or other data, the service C transparently creates a transport endpoint $C_A$ (e.g., TCP/IP or UDP/IP socket), allowing it to deal with packet loss and retransmission, congestion detection and avoidance, and other aspects of transport data transmission, as done by the endpoints A and B.

Service C may create a single endpoint $C_A$ facing endpoint A, or a pair of endpoints $C_A$ and $C_B$, facing A and B respectively. The endpoint $C_A$ facing endpoint A hall have an address of an opposite endpoint B (IP address $IP_B$ and port $P_B$ per [0054]) and the transport state of endpoint B as stored by service C as a result of session tracking prior to creation of endpoint $C_A$. In the same way, the endpoint $C_B$ shall have the attributes of endpoint A (IP address $IP_A$ and port $P_A$).

According to one or more embodiments, the service C stores data queries and data responses as they are relayed between endpoints A and B, without becoming a transport-level endpoint.

According to other embodiments, the service C may retrieve the data responses from one of the endpoints, or receive it from another data source.

According to one or more embodiments, the service C may respond to data queries from both endpoints A and B.

According to one or more embodiments, the service C responds to data queries from endpoints A and/or B, based on at least one variable from the following group: configuration information, temporal information, frequency information, ordinal information, system load information, network state information, client information and identification information.

According to one or more embodiments, endpoint A sends query $QA_1$ to endpoint B to which service C responds by sending previously stored response $RC_1$. Upon receiving response $RC_1$, endpoint A sends another data query $QA_2$. If service C does not have a matching response to the query $QA_2$ stored, it relays the query to endpoint B, receives response $RB_2$ and relays it to endpoint A.

As a result of response $RC_1$ delivered to endpoint A by service C, the counters of sent and received data of endpoint A and B may be in disagreement. To allow switch back to relay mode, where queries and responses are again relayed between A and B, service C performs an ongoing modification of sequences for data frames it relays between A and B as shown, e.g., in FIG. 4. For example, when request $QA_2$ is received from endpoint A, endpoint A reports receiving data up to $Y_3'$ that reflects the data received from endpoint $C_A$, as part of $RC_1$ response. At the same time, endpoint B has sent data up to sequence $Y_2$, as part of its communication with endpoint $C_B$.

Similarly the counters of data that endpoint B received and endpoint A sent ($X_3'$ and $X_4$ respectively), do not match either.

To eliminate the delta between $Y_3'$ and $Y_2$ as well, as between $X_3'$ and $X_4$, service C modifies sequences of sent and received data when relaying data between A and B, in both directions.

Furthermore, endpoint A may initiate another query $QA_3$, which can be replied to by service C, using previously stored response $RC_3$.

In other words, service C may alternate between responding to endpoint queries from one or both endpoints, and relaying queries and responses between two endpoints.

(b) Queries and Responses Modification

Figure 5:
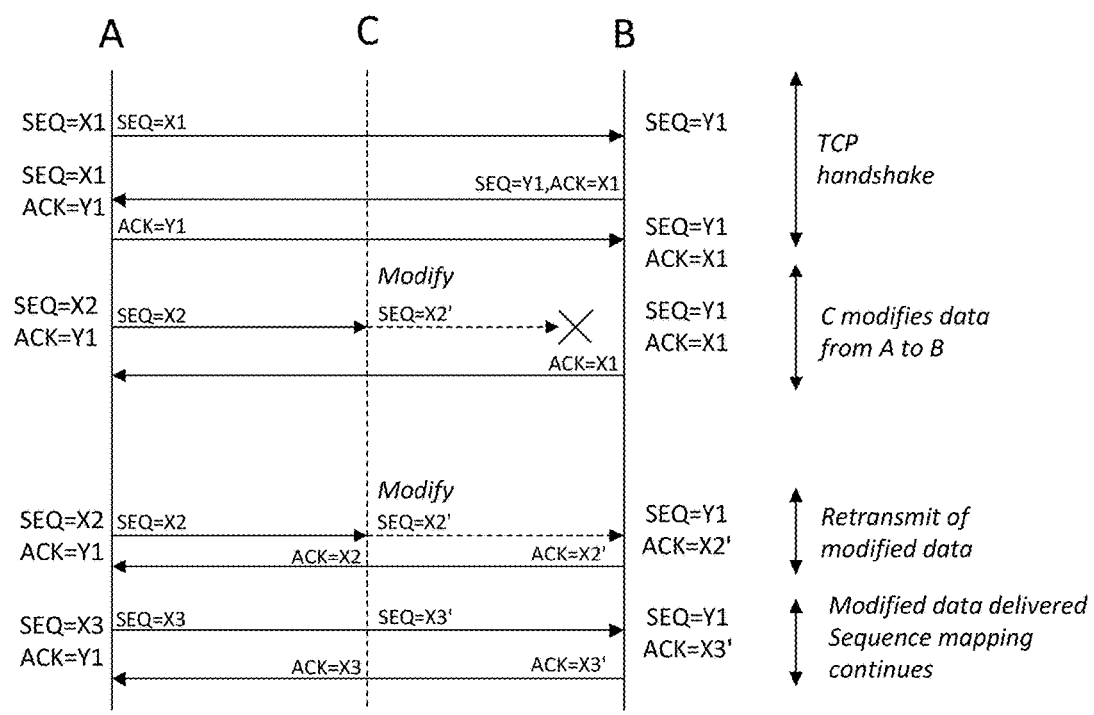
FIG. 5 is a flow diagram illustrating data modification in accordance with one or more embodiments.

According to one or more embodiments, following establishment of session S, as described above in [0028-0031], the service C modifies data queries and/or data responses as relayed between two endpoints A and B, as illustrated by way of example in FIG. 5.

In accordance with one or more embodiments, service C does not utilize a transport endpoint for purposes of sending the modified data, but rather continues to track the transport state of endpoint A and B and relies on the sending endpoint to re-send the data in case of packet loss.

As part of modification of the relayed data, service C may need to change protocol checksums of the frames to reflect the new payload.

In case of modification by C of data sent from A to B, the packet loss of the modified data may occur between C and B. In this case, service C relays the data frames reflecting such loss from B to A, causing endpoint A to retransmit the lost frames and service C to re-apply modification again. C tracks the re-transmitted frames using the stored session status information and re-applies the modification again.

According to other embodiments, to deliver modified data to endpoint B, service C creates a new transport endpoint $C_B$ facing endpoint B. Such endpoint $C_B$ utilizes IP address $IP_A$ and port $P_A$ of endpoint A, and relays the modified data in continuation of the frames previously relayed from endpoint A to endpoint B.

When service C creates an endpoint $C_B$ to deliver modified data to endpoint B, service C may optionally create an endpoint $C_A$ to facilitate communication with endpoint A, for example, for purposes of receiving data responses from it. Similarly to the endpoint $C_B$, the endpoint $C_A$ utilizes IP address $IP_B$ and port $P_B$ of opposite endpoint B, and communicates with endpoint B in continuation of the frames previously relayed from endpoint B to endpoint A.

Upon completion of delivery of the modified data, service C may fall back to relaying frames between A and B, while making necessary adjustments for sequences of sent and received data, as described in [0069-0071].

According to one or more embodiments, service C modifies data queries and/or responses relayed from endpoint A to endpoint B, as part of negotiation of endpoint capabilities, in order to affect format, protocol, or other attribute of session S.

According to one or more embodiments, service C modifies parameters of a data query sent by endpoint A to negate a capability reported by endpoint A. For example, service C may modify the capability to receive a response in a compressed format reported by A, causing the opposite endpoint B to transmit its response in a compressed format.

Service C subsequently receives the compressed response $RB_{10}$, modifies it by decompressing the payload and delivers to endpoint A in a modified form, resulting in optimization of network between B and C and improved performance.

According to one or more embodiments, service C modifies response $RB_{11}$ received from endpoint B, including but not limited to rendering of the textual data in different format, image adaptation to endpoint device capabilities, change in video quality, and transcoding of audio and/or video data into different format, among others.

The modification of responses as described in [0084] can be done for a number of purposes, including improving utilization of network resources between the service C and the endpoint receiving the modified data, adapting the data responses to the endpoint application capabilities, improving application performance, among others.

According to one or more embodiments, the service C may modify data responses relayed between endpoints A and B, that pertain to data items or portions of data items available at one of or both endpoints, e.g., as utilized in peer-to-peer protocols like Bittorrent, eDonkey, and others.

(c) Introduction of New Requests

Figure 6:
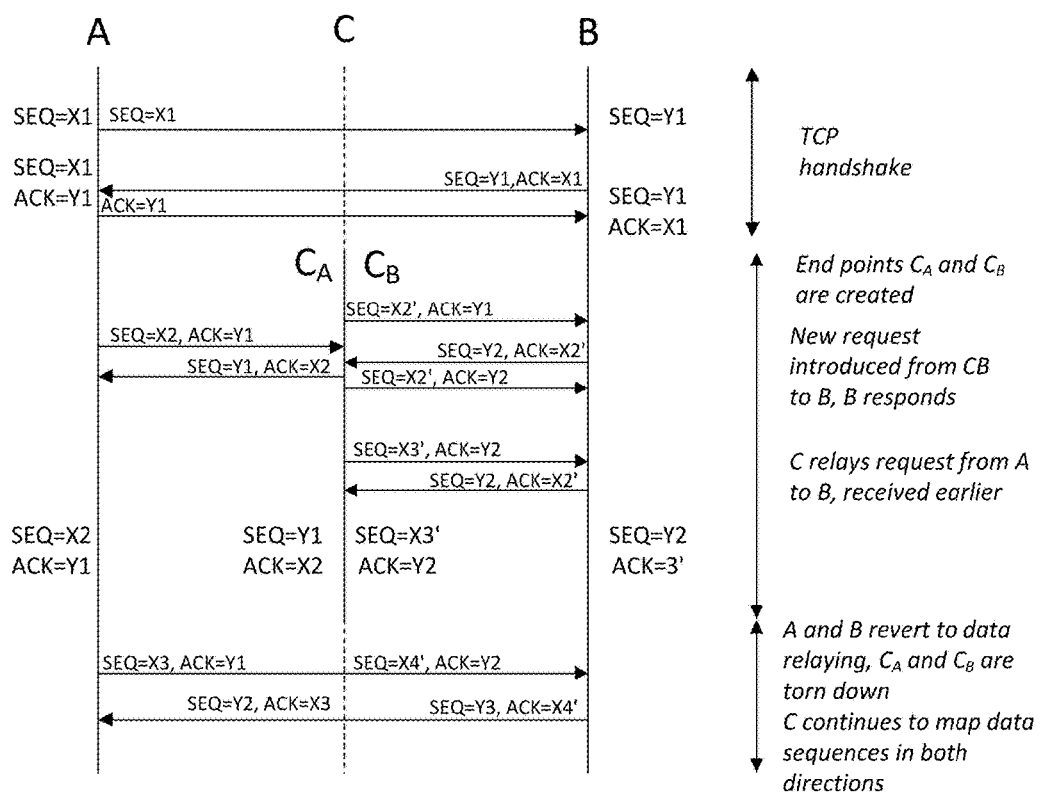
FIG. 6 is a flow diagram illustrating new request introduction in accordance with one or more embodiments.

According to one or more embodiments, the service C may introduce new requests to endpoint A and/or endpoint B within session S, in addition and/or instead of queries sent by respective endpoints, as depicted in FIG. 6.

According to one or more embodiments, the service C may utilize an endpoint approach to transmission of new queries and reception of responses from endpoints A and B, as described in [0035-0037] and [0054-0059].

According to one or more embodiments, the service C combines caching of responses and response modification, introduction of new requests with response caching, and relaying of data between endpoints in the same session S.

According to one or more embodiments, the service C modifies data availability responses in combination with as reported by one or both endpoints to improve the cache hit ratio of service C by including in it such data items (or portions of items) that are stored by the service C, and/or excluding such data items (or portions of item) that are not.

According to additional embodiments, the service C modifies the data availability information as reported by one or both endpoints to force the endpoints to transfer such data items (or portions of items) that are currently not stored by the service C, as a way to populate the cache managed by the service C.

According to one or more embodiments, the service C modifies data queries between endpoint A and endpoint B to disable use of end-to-end encryption, to allow subsequent caching of data responses.

According to one or more embodiments, the service C stores modified data responses as delivered by it to the endpoints, and may retrieve a stored copy of modified data response, rather than perform the modification on the fly.

According to one or more embodiments, the service C may deliver a data response stored through response caching mechanism as described above, if the stored copy of data response matches the needs for modification.

According to one or more embodiments, the service C may utilize a stored copy of a data response, stored through a response storing mechanism as described above, as an input for data modification, rather than allowing the full data response to be delivered from the endpoint B.

According to one or more embodiments, the service C may introduce new requests into session S, in order to trigger endpoints responses needed for optimal response caching.

Such data responses may include, but are not limited to, missing portions of content objects already stored in service C, content objects that have been identified as popular, however have not been stored by service C yet, content objects associated with other objects known to the service C (e.g., objects referenced by HTML page or additional playback levels for adaptive bitrate video etc.).

According to one or more embodiments, a system is provided for transparent modification of at least one data communications session between two endpoints A and B, in a way that requires endpoints A and B establish a data session between each other first, which includes at least one node of an IP network, designed and configured to provide at least one of services (a) to (c), as described above.

According to one or more embodiments, the optimization system can reside in single or multiple service provider networks, dedicated hosting location, datacenters, and enterprise or at residential premises as described in FIG. 7 below.

According to one or more embodiments, the system comprises multiple components in different physical locations.

According to one or more embodiments, multiple systems can reside in the data path of same connection S between two endpoints A and B in series.

According to one or more embodiments, the optimization service can operate at the same network node, on which one of the endpoints resides.

Figure 7:
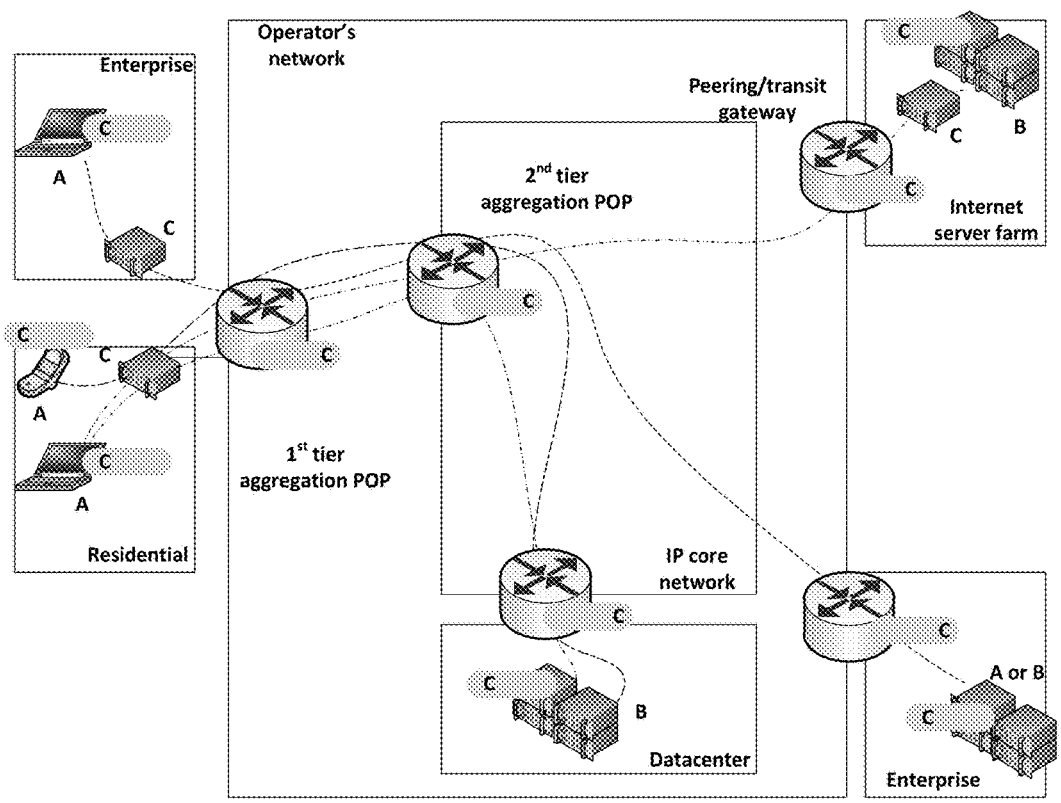
FIG. 7 is a simplified diagram illustrating an exemplary network architecture in accordance with one or more embodiments.

According to one or more embodiments, multiple optimization services can operate in series, as illustrated in FIG. 7.

According to one or more embodiments, multiple optimization services can operate in parallel, e.g., as part of load balancing of sessions done by redirecting device.

According to one or more embodiments, multiple instances of optimization services can operate in series and/or in parallel, wherein each instance of optimization carries out different and/or same data modification and storing operations.

According to one or more embodiments, multiple instances of optimization services can operate in series and/or in parallel, wherein each instance of optimization carries out different data modification and storing operations, in coordination with one another.

The processes of the optimization service described above may be implemented in software, hardware, firmware, or any combination thereof. The processes are preferably implemented in one or more computer programs executing on a programmable device including a processor, a storage medium readable by the processor (including, e.g., volatile and non-volatile memory and/or storage elements), and input and output devices. Each computer program can be a set of instructions (program code) in a code module resident in the random access memory of the device. Until required by the device, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the optimization service may comprise one or more physical machines, or virtual machines running on one or more physical machines. In addition, the optimization service may comprise a cluster of computers or numerous distributed computers that are connected by the Internet or another network.

Accordingly, the foregoing description and attached drawings are by way of example only, and are not intended to be limiting.

What is claimed is:

1. A computer-implemented method for transparently optimizing data transmission between a first endpoint and a second endpoint in a computer network, said endpoints having a directly established data session therebetween, the data session being identified by each endpoint at least to itself in the same way throughout the session, the method comprising:

relaying application level data between the endpoints transparently in the session using a network optimization service; and transparently modifying parameters of at least some of the application level data transmitted from the second endpoint to the first endpoint using the network optimization service that modifies a capability to receive a response in a compressed format reported by the first endpoint to cause the second endpoint to transmit a response in a compressed format and modifying a compressed response from the second endpoint to the first endpoint by decompressing the response in order to optimize data communications between the endpoints, wherein transparently modifying at least some of the application level data comprises changing the application level data, replacing the application level data, or inserting additional application level data such that the first endpoint receives different application level data than was sent by the second endpoint.

2. The method of claim 1, wherein the session comprises a TCP or UDP session.

3. The method of claim 1, wherein the session is identified by identifiers including an IP address and transport port of the first endpoint, an IP address and transport port of the second endpoint, and a transport protocol used, and wherein the identifiers do not change throughout a lifetime of the session.

4. The method of claim 1, wherein the optimization service or a redirection service communicating with the optimization service is in a data path between the first and second endpoints.

5. The method of claim 1, wherein the step of relaying data includes creating a first transparent endpoint facing the first endpoint, wherein first transparent endpoint appears to the first endpoint as the second endpoint, such that the first endpoint communicates with the first transparent endpoint.

6. The method of claim 5, wherein the step of relaying data further includes creating a second transparent endpoint facing the second endpoint, wherein the second transparent endpoint appears to the second endpoint as the first endpoint, such that the second endpoint communicates with the second transparent endpoint.

7. The method of claim 1, wherein the step of relaying data is performed without creating a separate transparent endpoint, and instead by tracking the transport state of the endpoints, and relying on the endpoint sending data to resend data in case of packet loss, and modifying the resent data to be sent to the second endpoint.

8. The method of claim 1, wherein the step of relaying data includes receiving data communicated between the endpoints through a redirection device, and wherein the step of relaying data comprises relaying only a portion of data frames in the session between the first and second endpoints.

9. The method of claim 1, wherein, said step of relaying data includes continuously tracking and storing a state of the session, including tracking what data has been sent and received by each endpoint and transport-level attributes, link level attributes, or network-level attributes of the session.

10. The method of claim 9, wherein tracking involves monitoring multiple tiers of tunneling.

11. The method of claim 1, wherein the step of transparently modifying comprises analyzing a data query from the first endpoint directed to the second endpoint and/or a data response to the data query received from the second endpoint, matching the data query and the data response with a previously stored data response, and delivering the previously stored data response to the first endpoint, while blocking relaying of the data response from the second endpoint.

12. The method of claim 11, further comprising causing the second endpoint to terminate the session on its end or to stall delivery of the data response.

13. The method of claim 11, wherein delivering the previously stored data response comprises utilizing the IP and port address of the second endpoint and the session state of the session as a continuation of the session between the first and second endpoints.

14. The method of claim 11, wherein the step of matching is based on at least one variable selected from the group consisting of temporal information, ordinal information, frequency information, client information, and identification information.

15. The method of claim 1, wherein the step of transparently modifying comprises:
analyzing a first data query from the first endpoint directed to the second endpoint, matching the first data query with a previously stored data response, and delivering the previously stored data response to the first endpoint through a separate transparent endpoint; and
receiving a second data query from the first endpoint directed to the second endpoint, determining that a data response responding to the second data query has not been stored at the optimization service, relaying the second data query to the second endpoint, receiving the data response corresponding to the second query from the second endpoint, and relaying the data response from the second endpoint to the first endpoint without use of a separate transparent endpoint, while modifying the transport parameters of such response so that it appears as a continuation of the session between the first and second endpoints.

16. The method of claim 1, wherein the step of transparently modifying data comprises rendering textual data in a different format, adapting data to endpoint device capabilities, changing video quality, or transcoding audio and/or video data into a different format.

17. The method of claim 1, wherein the step of transparently modifying comprises modifying parameters of a data query or response from one endpoint to another to affect an attribute of the session.

18. The method of claim 17, wherein the step of relaying data includes creating a first transparent endpoint facing the first endpoint, wherein first transparent endpoint appears to the first endpoint as the second endpoint, such that the first endpoint communicates with the first transparent endpoint.

19. The method of claim 17, wherein the step of relaying data is performed without creating a separate transparent endpoint, and instead by tracking the transport state of the endpoints, and relying on the endpoint sending data to resend data in case of packet loss, and modifying the resent data to be sent to the second endpoint.

20. The method of claim 1, where step of transparently modifying data comprises modifying parameters of a data query or response from one endpoint to another to affect an attribute of subsequent data queries or responses so that the cacheability of data queries in the session is improved.

* * * * *